(12) United States Patent
Usuda et al.

(10) Patent No.: US 8,708,623 B2
(45) Date of Patent: Apr. 29, 2014

(54) ANGLE TOOL HOLDER FOR FIVE-FACE MACHINING

(75) Inventors: Satoi Usuda, Inabe (JP); Daisuke Ito, Kuwana (JP); Satoshi Yoshinobu, Aichi-pref. (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 840 days.

(21) Appl. No.: 12/992,006

(22) PCT Filed: Oct. 1, 2009

(86) PCT No.: PCT/JP2009/067173
§ 371 (c)(1),
(2), (4) Date: Nov. 10, 2010

(87) PCT Pub. No.: WO2011/039886
PCT Pub. Date: Apr. 7, 2011

(65) Prior Publication Data
US 2011/0268520 A1 Nov. 3, 2011

(51) Int. Cl.
*B23C 1/12* (2006.01)
(52) U.S. Cl.
USPC .......................................... 409/144; 409/230
(58) Field of Classification Search
CPC ............ B23Q 1/25; B23Q 1/703; B23Q 3/12; B23Q 5/045; B23C 1/12
USPC .................. 409/144, 201, 215, 230
See application file for complete search history.

(56) References Cited

U.S. PATENT DOCUMENTS

| 3,757,637 | A | * | 9/1973 | Eich et al. | 409/230 |
| 3,930,301 | A | * | 1/1976 | Wagner | 483/32 |
| 4,384,811 | A | * | 5/1983 | Eckstein et al. | 409/215 |
| 5,211,515 | A | * | 5/1993 | Hirabayashi | 409/230 |
| 6,450,074 | B1 | * | 9/2002 | Yong-Chang | 82/154 |
| 2007/0071566 | A1 | * | 3/2007 | Young et al. | 409/234 |
| 2008/0199270 | A1 | * | 8/2008 | Yoshikawa et al. | 409/232 |

FOREIGN PATENT DOCUMENTS

| JP | 61-033832 | 2/1986 |
| JP | 63-744 U | 1/1988 |

(Continued)

OTHER PUBLICATIONS

International Search Report and Written Opinion for corresponding International Application No. PCT/JP2009/067173 mailed Dec. 8, 2009 (with partial English translation).

*Primary Examiner* — Daniel Howell
*Assistant Examiner* — Michael Vitale
(74) *Attorney, Agent, or Firm* — Renner, Otto, Boisselle & Sklar, LLP

(57) ABSTRACT

The invention provides an angle tool holder to be disposed on an attachment attached to a spindle head of a vertical machining center and holding the angle tool holder to enable five-face machining of a workpiece. The angle tool holder denoted as a whole by reference number 500 has a shank 510 inserted to a spindle of the main machine, wherein a rotation of the shank 510 is transmitted via a gear transmission mechanism or the like disposed in a housing 540 so that the direction of a drive shaft thereof is varied orthogonally to thereby drive the angle cutter 520. An arm 550 connected to the housing 540 has three pull stud bolts 570 disposed thereon. The three pull stud bolts 570 are arranged at 90-degree intervals, and are clamped simultaneously by three collet chucks out of the four collet chucks disposed on the attachment unit for five-face machining.

2 Claims, 17 Drawing Sheets

(56) References Cited

FOREIGN PATENT DOCUMENTS

| JP | 1-114258 U | 8/1989 |
| JP | 3-4339 | 1/1991 |
| JP | 07-308839 | 11/1995 |
| JP | 10-328913 A | 12/1998 |
| JP | 2008-284643 A | 11/2008 |

\* cited by examiner (a)

(b)

(c)

(a)

(b)

(a)

(b)

(a)

(b)

(a)

(b)

ANGLE TOOL HOLDER FOR FIVE-FACE MACHINING

TECHNICAL FIELD

The present invention relates to an angle tool holder disposed on an attachment unit for five-face machining provided on a vertical machining center to enable five-face machining of workpieces.

BACKGROUND ART

Patent documents 1 and 2 disclose angle tool holders attached in a detachable manner to a spindle of a machine tool so as to rotate tools around an axis line orthogonal to the axis line of a spindle.

CITED REFERENCES

Patent Documents

[Patent Document 1] Japanese Patent Publication No. 03-4339
[Patent Document 2] Japanese Patent Application Laid-Open Publication No. 07-308839

SUMMARY OF THE INVENTION

Problem to be Solved by the Invention

The art disclosed in patent document 1 restricts the rotation of an angle tool holder using a hydraulic piston. Further, patent document 2 discloses a mechanism for driving a slide member disposed on an angle tool holder through use of pressure of a through coolant so as to disengage the slide member from a positioning block.

The clamp mechanisms disclosed in patent documents 1 and 2 both have low rigidity and have little ability to endure heavy machining performed by the angle tool.

The object of the present invention is to provide an angle tool holder for five-face machining capable of being adopted in a vertical machining center so as to realize heavy five-face machining.

Means for Solving the Problem

An attachment unit for five-face machining attached to a spindle head of a vertical machining center to which the present invention is applied comprises a ring-shaped cylinder member fit to an outer circumference of a spindle housing supporting a spindle and protruded from a lower end of a spindle head of a vertical machining center and thereby fixed to the spindle head, a clamp unit directly connected to a ring-shaped piston disposed within the ring-shaped cylinder member and moved vertically, and four collet chucks disposed at even angular intervals on a circumference on a lower side of the clamp unit.

The angle tool holder according to the present invention comprises a shank inserted to the spindle of the vertical machining center, a housing supporting the shank and an angle tool in a rotatable manner, and having in the interior thereof a transmission mechanism for converting a drive force of the shank to an orthogonal direction and transmitting the same to the angle tool, an arm connected to the housing, and three pull stud bolts disposed on the arm and held via three collet chucks out of the four collet chucks on the attachment unit for five-face machining.

Effect of the Present Invention

The attachment unit for five-face machining to which the present invention is applied can be disposed additionally to a vertical machining center to thereby enhance the machining ability of the machining center easily through use of the present angle tool holder. Further, the angle tool holder according to the present invention has high rigidity and can be applied to heavy machining.

BEST MODE FOR CARRYING OUT THE INVENTION

Figure 6:
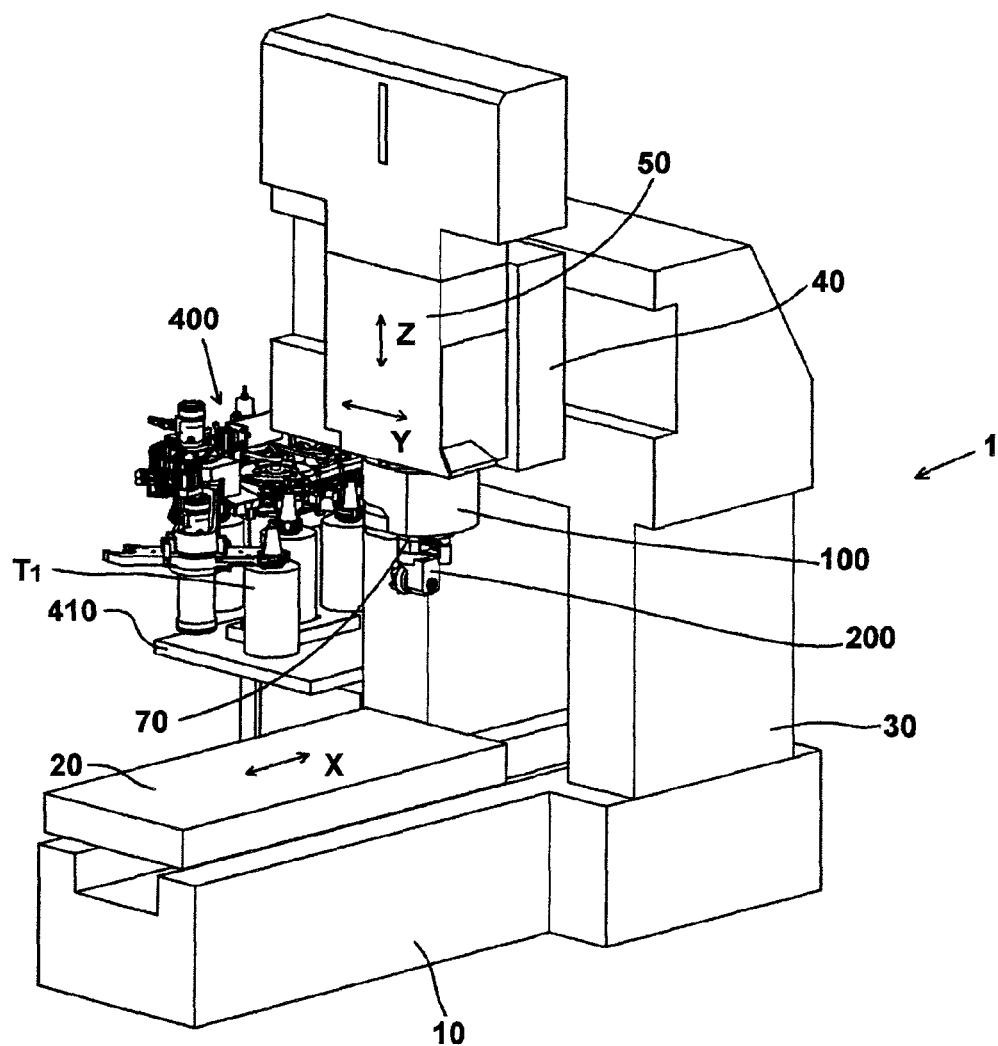
FIG. 6 is a mechanical arrangement diagram of a vertical machining center.

FIG. 6 is a perspective view showing the mechanical arrangement of a vertical machining center equipped with an attachment unit for five-face machining to which the present invention is applied.

The vertical machining center referred to as a whole by reference number 1 has a table 20 moving in the direction of axis X on a base 10.

A double column 30 is erected on the base 10, and a saddle 40 supported on a guide rail disposed on a front side of the double column 30 moves in the direction of axis Y.

A spindle head 50 is disposed on the front side of the saddle 40, by which a spindle 70 is moved in the direction of axis Z.

A bracket 410 is attached to the base 10, and a tool magazine 400 is disposed thereon. The tool magazine 400 stores various tools T$_1$, and an ATC arm 420 supplies necessary tools to the spindle 70 in an exchangeable manner.

The attachment unit 100 for five-face machining is fixed to an outer circumference portion of a cylindrical spindle housing supporting the spindle 70. An angle tool holder 200 is attached to the spindle head 50 using the attachment unit 100 for five-face machining.

Figure 7:
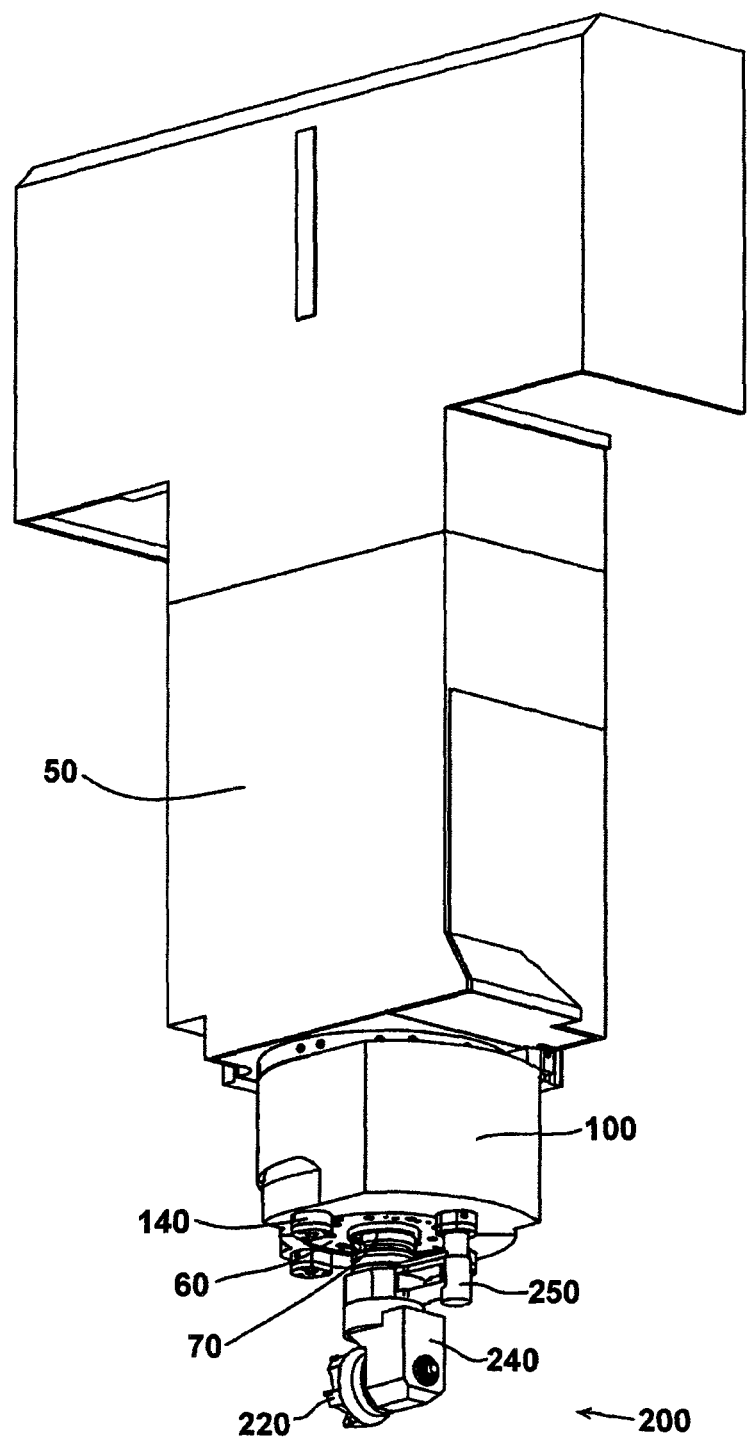
FIG. 7 is an explanatory view of a spindle head equipped with the attachment for five-face machining.
Figure 8:
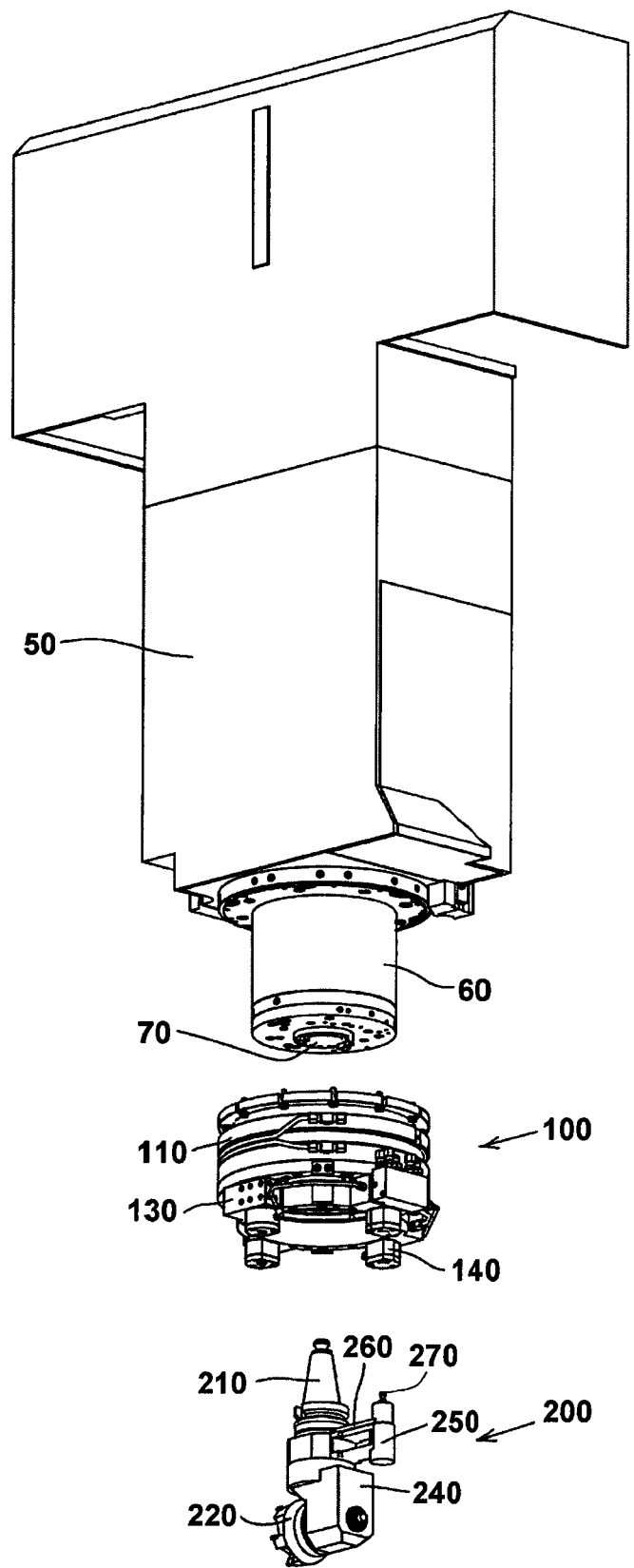
FIG. 8 is an explanatory view of a spindle head equipped with the attachment for five-face machining.
Figure 9:
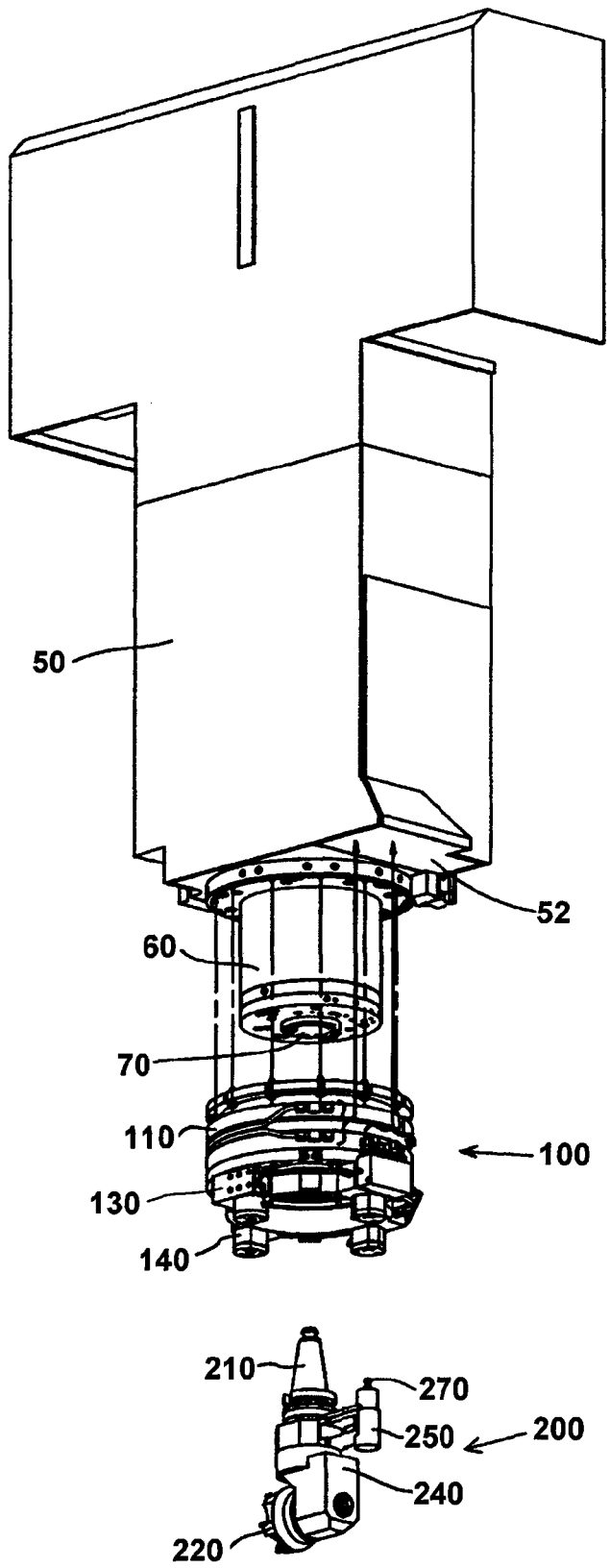
FIG. 9 is an explanatory view of the spindle head equipped with the attachment for five-face machining.

FIGS. 7, 8 and 9 are an assembly drawing of the spindle head 50 equipped with the attachment unit 100 for five-face machining, and exploded views of the major components thereof.

A cylindrical spindle housing 60 is projected downward from the lower end of the spindle head 50, which supports the spindle 70 in a rotatable manner.

The attachment unit 100 for five-face machining has a bore portion inserted to an outer circumference of the spindle housing 60, and the upper portion thereof is fixed via bolts or the like to the lower end portion 52 of the spindle head 50.

The attachment unit 100 for five-face machining has a ring-shaped cylinder member 110 fit to the spindle housing 60 and fixed to the lower end of the spindle head 50, and a clamp unit 130 is directly connected to a ring-shaped piston 120 disposed within the ring-shaped cylinder member 110 and which is moved up and down.

Four collet chucks 140 are disposed on a circumference on a lower side of the clamp unit 130.

A generally used angle tool holder 200 comprises a shank 210 inserted to a tapered hole of the spindle 70 and an angle cutter 220 driven by the rotating force of the shank 210. Power transmission mechanisms and bearings are disposed within the housing 240. An arm 250 is equipped with a pull stud bolt 270.

When the pull stud bolt 270 is clamped by the collet chuck 140 on the clamp unit 130 in the manner described in detail later, the rotation of the angle tool holder 200 is restricted and cutting resistance is received by the collet chuck. When the pull stud bolt 270 is unclamped, the arm 250 revolves with the shank 210 and is allocated at a position corresponding to the four collet chucks 140.

Figure 10:
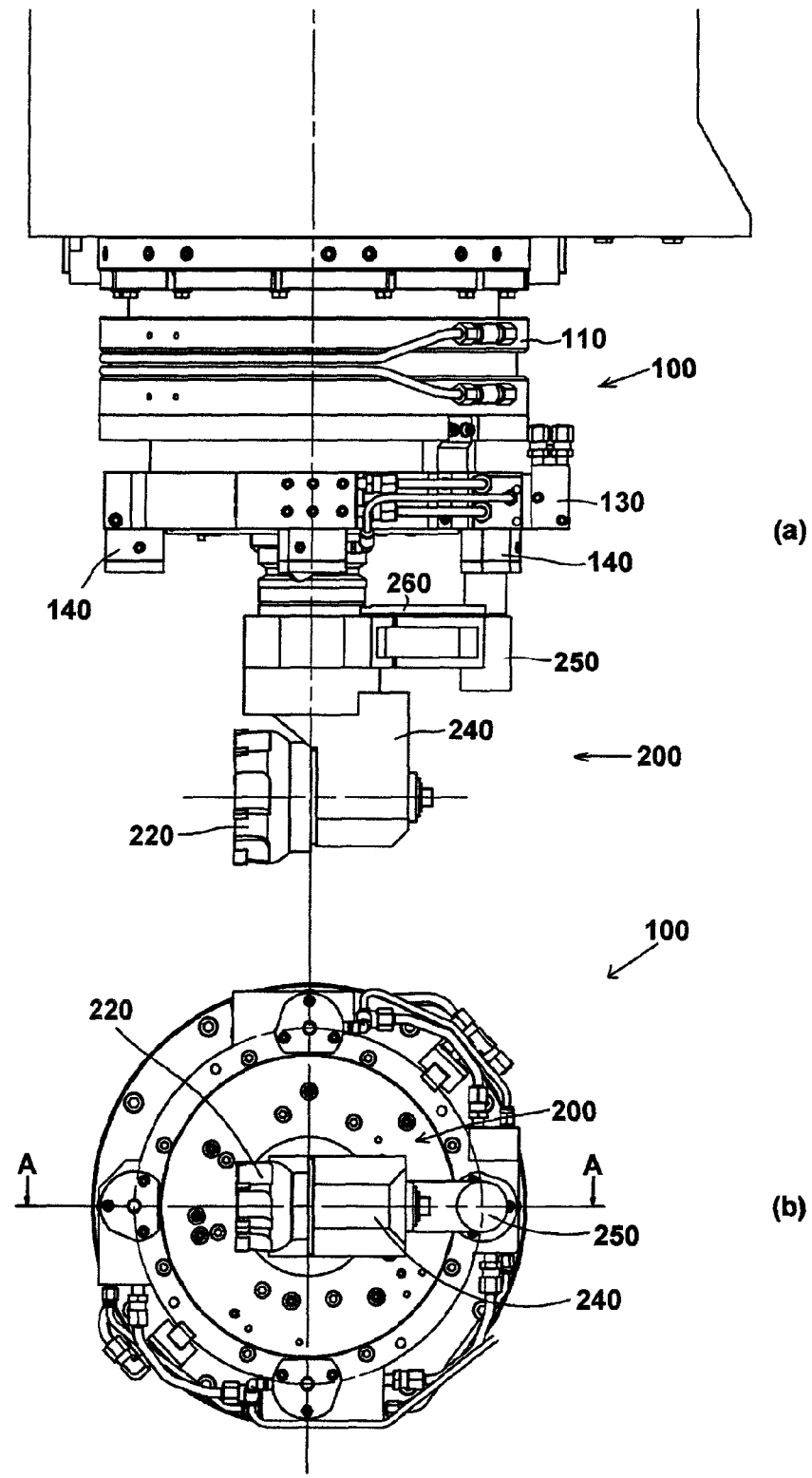
FIG. 10 is a front view and a bottom view of the attachment for five-face machining.

FIG. 10(*a*) is a front view and FIG. 10(*b*) is a bottom view of the attachment unit 100 for five-face machining, showing a state in which the clamp unit 130 of the attachment unit 100 for five-face machining is lowered and one of the four collet chucks 140 has clamped the pull stud bolt 270 on the arm 250 of the angle tool holder 200.

In this state, the angle cutter 220 is ready for processing.

Figure 11:
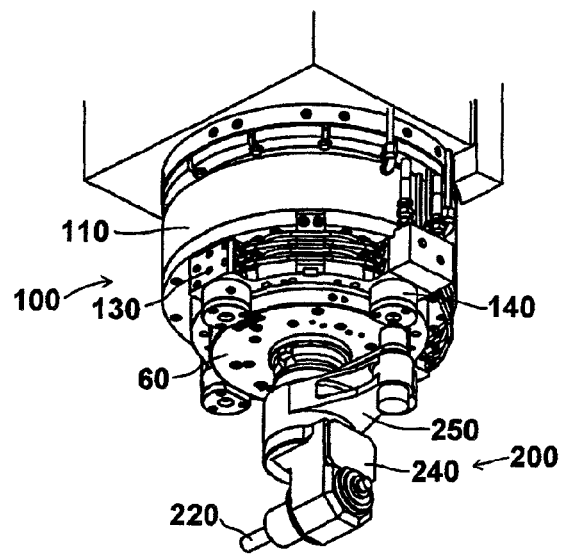
FIG. 11 is an explanatory view showing the clamping operation of the angle tool holder.
Figure 11:
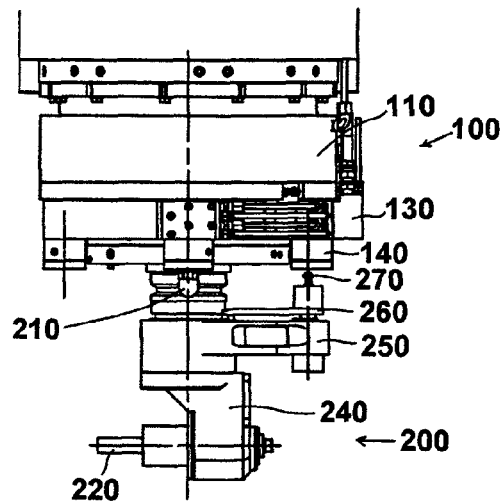

FIGS. 11(*a*) and 11(*b*) illustrate a state in which the angle tool holder 200 is allocated to one of the four collet chucks 140 of the attachment unit 100 for five-face machining. In this state, the clamp unit 130 of the attachment unit 100 for five-face machining is at a pulled up position.

Figure 12:
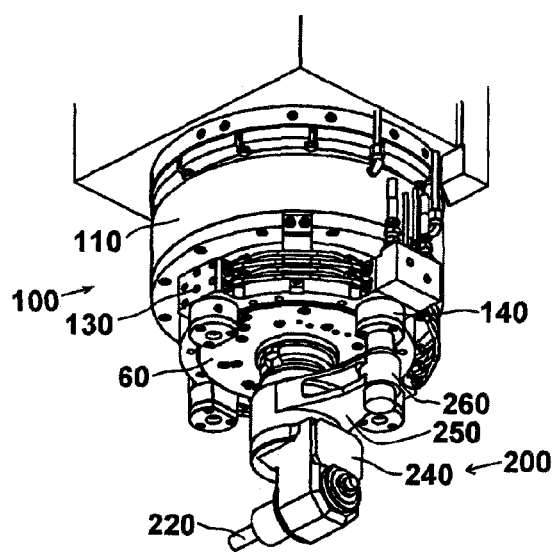
FIG. 12 is an explanatory view showing the clamping operation of the angle tool holder.
Figure 12:
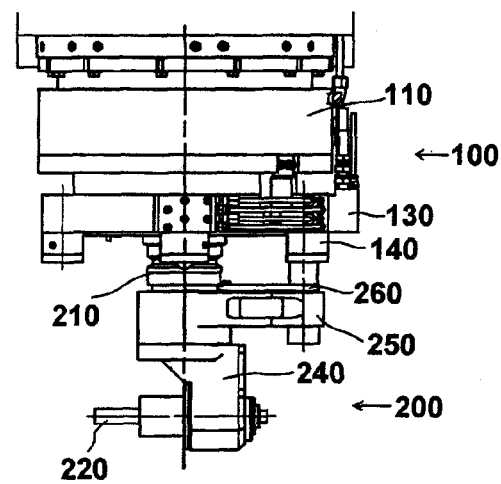

FIGS. 12(*a*) and 12(*b*) illustrate a state in which the clamp unit 130 of the attachment unit 100 for five-face machining is lowered with respect to the angle tool holder 200 having been allocated, so as to clamp the pull stud bolt 270 by the collet chuck 140.

FIGS. 13 through 16 are A-A cross-sections of FIG. 10(*b*) showing the details and the operations of the arrangement of the attachment unit 100 for five-face machining.

The attachment unit 100 for five-face machining has a ring-shaped cylinder member 110, wherein the ring-shaped cylinder member 110 is fixed via bolts 112 to the spindle head side. A hydraulic chamber 114 is disposed within the ring-shaped cylinder member 110, and a ring-shaped piston 120 is slidably disposed therein. Hydraulic ports 116*a* and 116*b* for driving the piston 120 is communicated with the hydraulic chamber 114.

The lower end of the piston 120 is connected to a ring-shaped clamp unit 130. Collet chucks 140 are disposed at four positions on the outer circumference of the clamp unit 130.

Each collet chuck 140 has a hydraulic chamber 152 formed within a body 150, and a piston 142 is slidably inserted within the hydraulic chamber 152.

The piston 142 opens and closes claws 144. Ports 154*a* and 154*b* are formed to communicate with the hydraulic chamber 152.

The angle tool holder 200 has a shank 210, which is inserted to and held by a shank hole formed on the spindle side. A notch is formed on the outer circumference of a shaft 212 formed integrally with the shank 210, to which an inner end portion 262 of a lever 260 is engaged. An arm 250 is connected to a housing 240, and the pull stud bolt 270 attached to the arm 250 passes through the lever 260 and is opposed to the side having the collet chucks 140.

Figure 13:
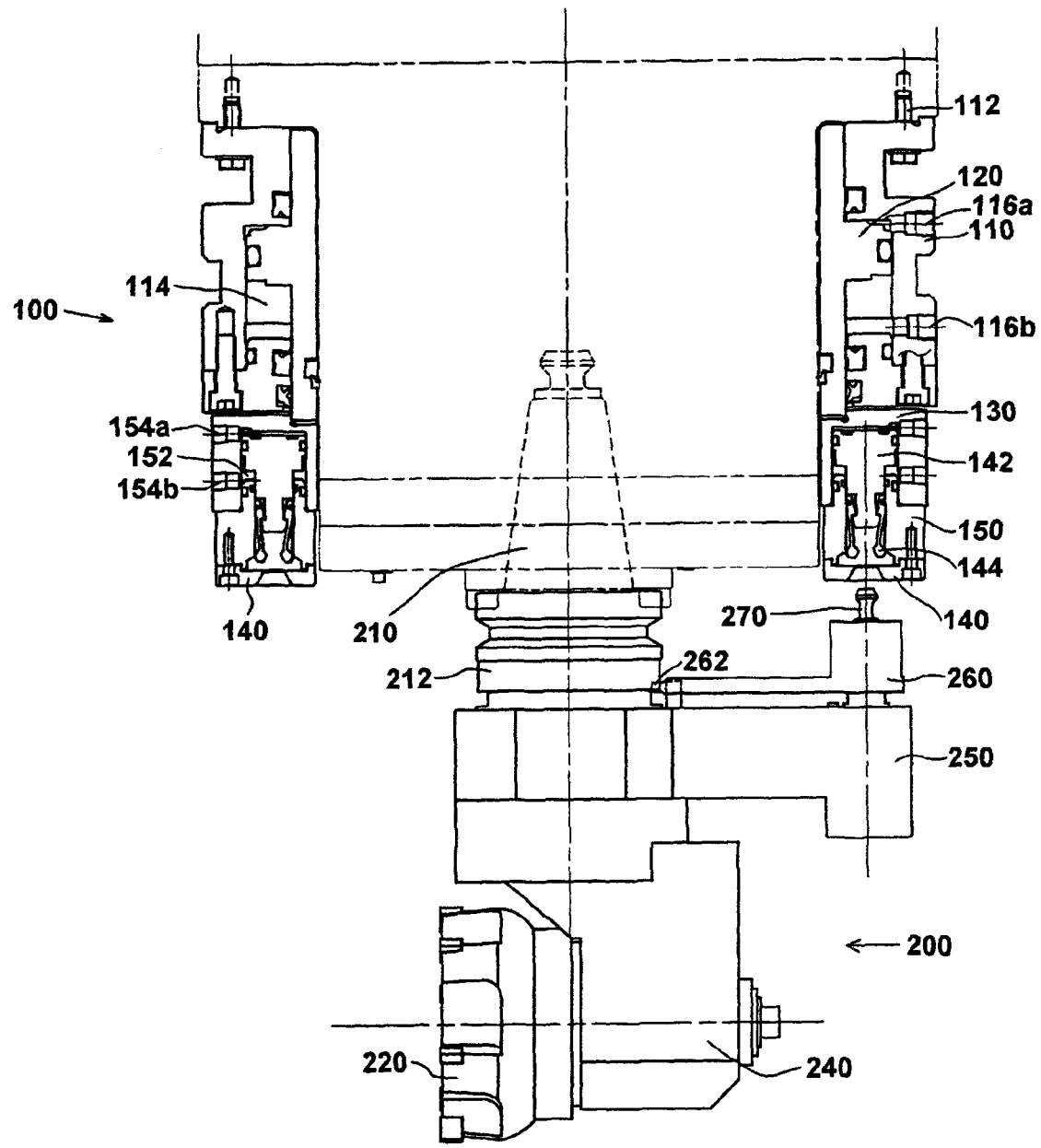
FIG. 13 is a cross-sectional view of the attachment unit for five-face machining.

FIG. 13 shows an operation to allocate the angle tool holder 200 exchanged on the spindle side to one of the four collet chucks 140. When the shaft 212 integrated with the shank 210 rotates at a low speed for allocation, the lever 260 engaged with the shaft 212 rotates the housing 240 integrated with the arm 250 to allocate the pull stud bolt 270 to a position corresponding to a given collet chuck 140.

During this operation, the piston 142 is biased toward the upper direction and the claws 144 are closed.

Figure 14:
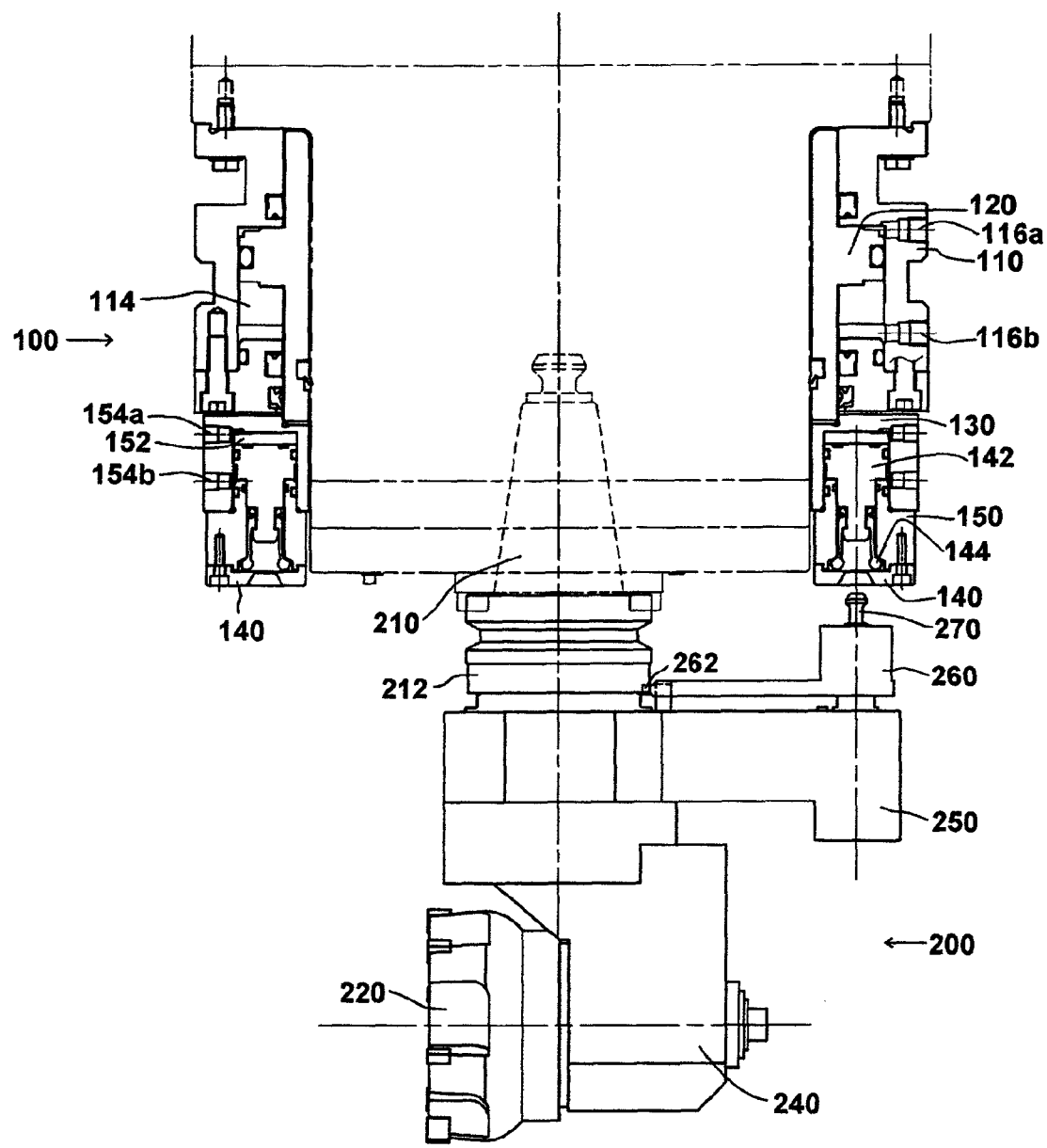
FIG. 14 is a cross-sectional view of the attachment unit for five-face machining.

FIG. 14 shows a state in which the allocation of the angle tool holder 200 has completed.

The piston 142 of the collet chuck 140 opposed to the pull stud bolt 270 is biased downward via hydraulic pressure so as to open the claws 144.

Figure 15:
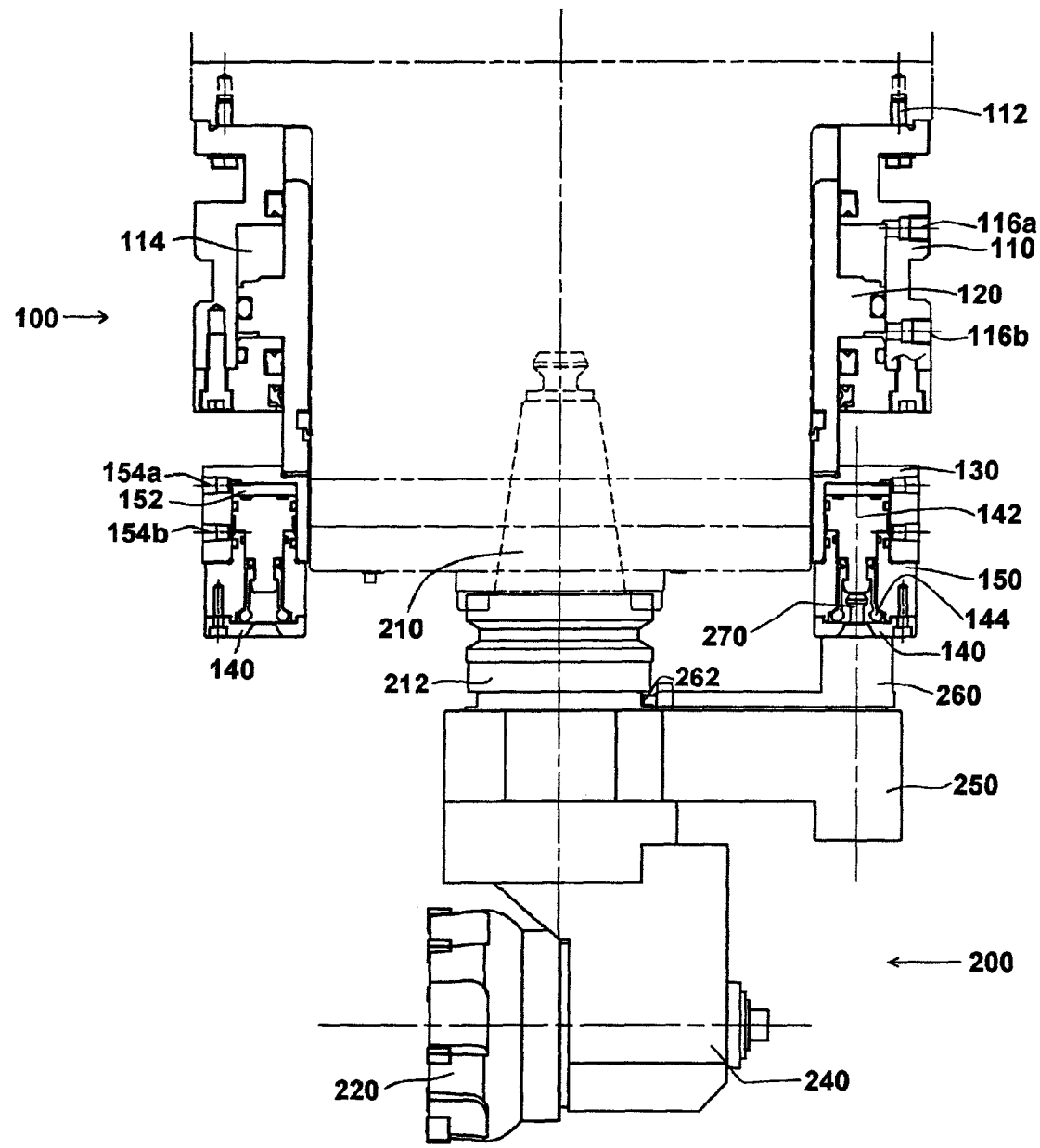
FIG. 15 is a cross-sectional view of the attachment unit for five-face machining.

FIG. 15 illustrates a state in which hydraulic oil is supplied through the port 116*a* to the hydraulic chamber 114 of the ring-shaped cylinder member 110 to drive the piston 120 downward so as to lower the clamp unit 130.

The collet chuck 140 receives the pull stud bolt 270 on the arm 250.

The inner end 262 of the lever 260 is disengaged with the notch on the shaft 212.

Figure 16:
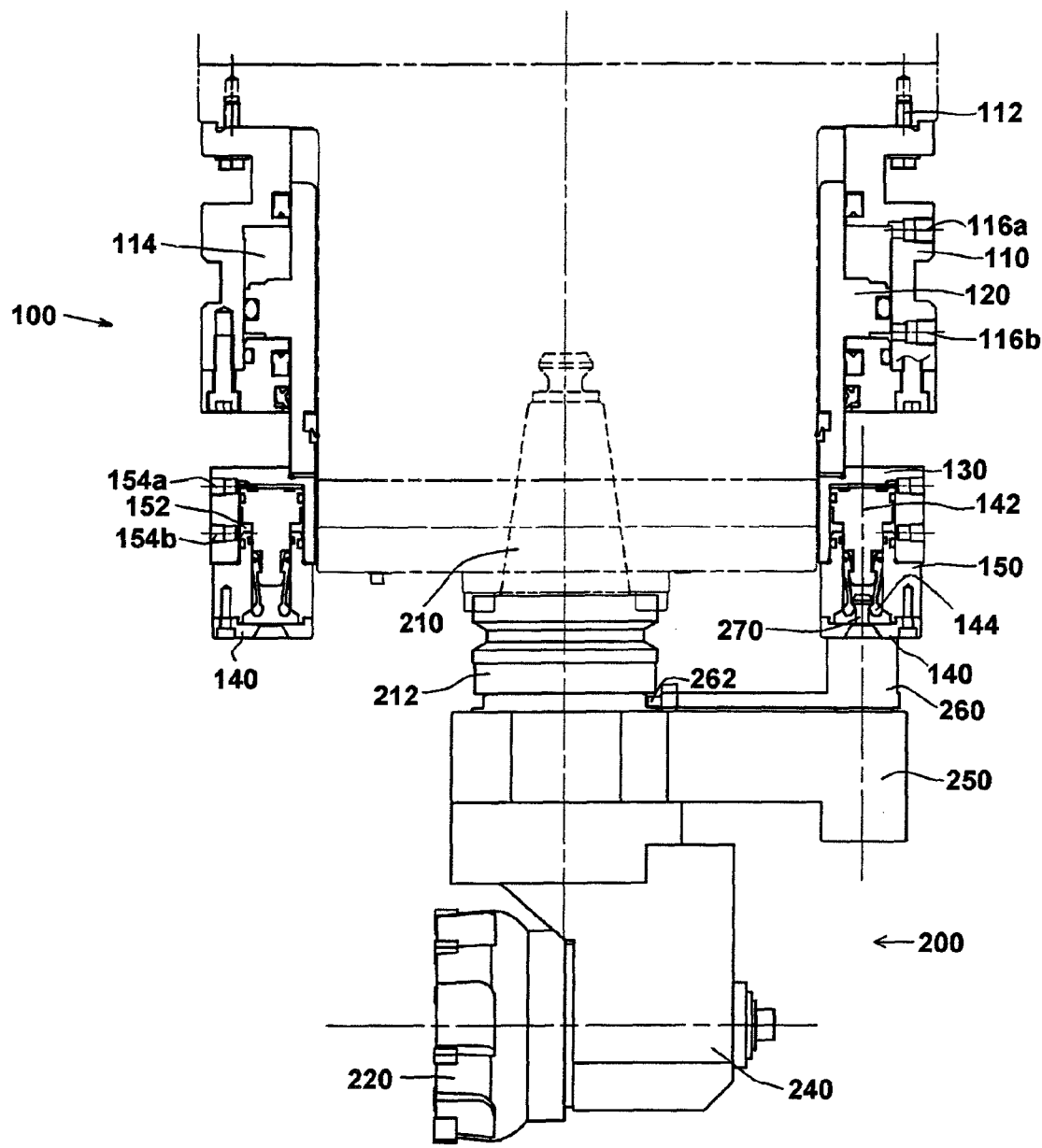
FIG. 16 is a cross-sectional view of the attachment unit for five-face machining.

FIG. 16 shows a state in which hydraulic oil is supplied through the port 154*b* to the hydraulic chamber 152 on the body 150 of the clamp unit 130 so as to elevate the piston 142, by which the claws 144 clamp the pull stud bolt 270.

In this state, the arm 250 on the angle tool holder 200 is gripped securely via the clamp unit 130 of the attachment unit 100 for five-face machining.

The shaft 212 integrated with the shank 210 drives the angle cutter 220 via the power transmitted from the spindle side, and subjects a workpiece to machining.

The lever 260 is separated from the shaft 212, according to which the occurrence of interference is prevented.

Figure 17:
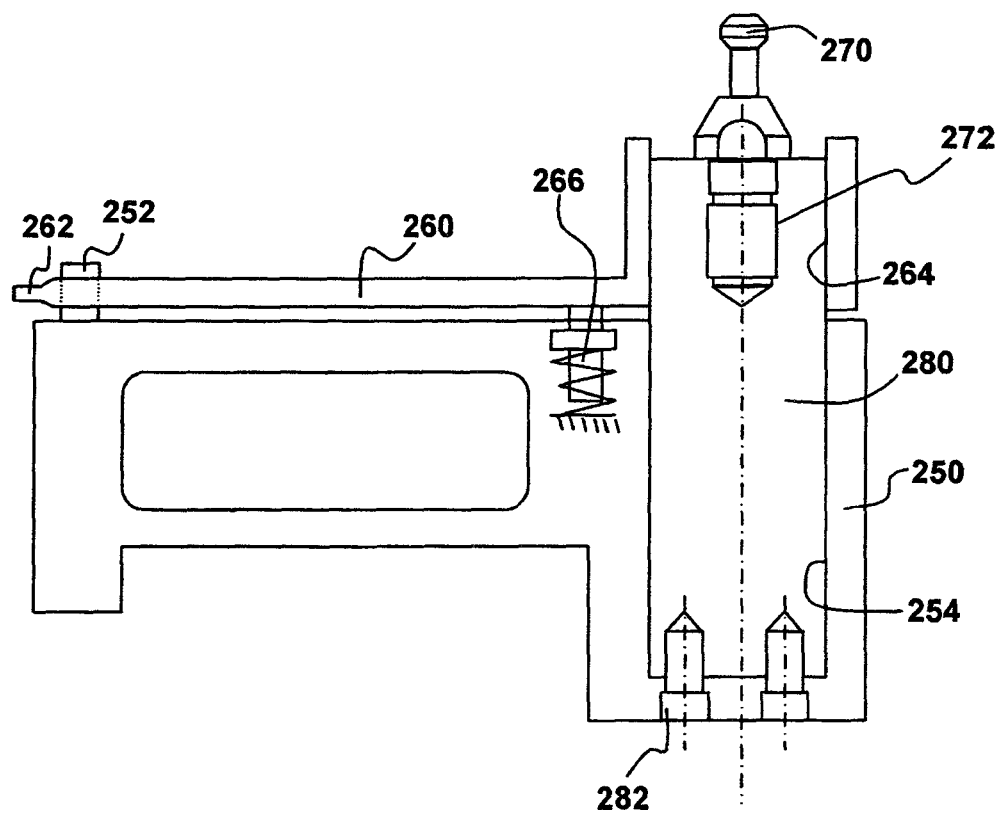
FIG. 17 is a detailed view of an arm and a lever of the angle tool holder.

FIG. 17 is a cross-sectional view showing the arrangement of the arm 250 and the lever 260.

A shaft 280 is inserted to a hole 254 with a bottom of the arm 250 and fixed thereto via bolts 282. The pull stud bolt 270 is erected on the upper end of the shaft 280 through use of a screw portion 272.

The lever 260 has a bore portion 264 fit to the outer circumference of the shaft 280, through which the lever is slidably supported on the shaft 280. A hole is formed near an inner end portion 262 of the lever 260, which is inserted to a projection 252 formed on the arm 250.

The lever 260 is biased away from the arm 250 via a spring 266, and the end portion 262 of the lever 260 is engaged with the notch on the shaft 212 to perform allocation.

As described above, the attachment unit for five-face machining can be attached to the vertical machining center in a supplemental manner so as to easily enhance the machining ability of the machining center.

Furthermore, the three collet chucks out of the four collet chucks not related to gripping the angle tool holder maintain their claws in a closed state.

Since the attachment unit 100 for five-face machining is disposed on the spindle, it is exposed to a harsh environment during machining in which cutting fluids are sprayed on the attachment unit 100.

Therefore, it is preferable to provide a device for preventing intrusion of particles through the openings of the three collet chucks 140 not used at that time.

Figure 1:
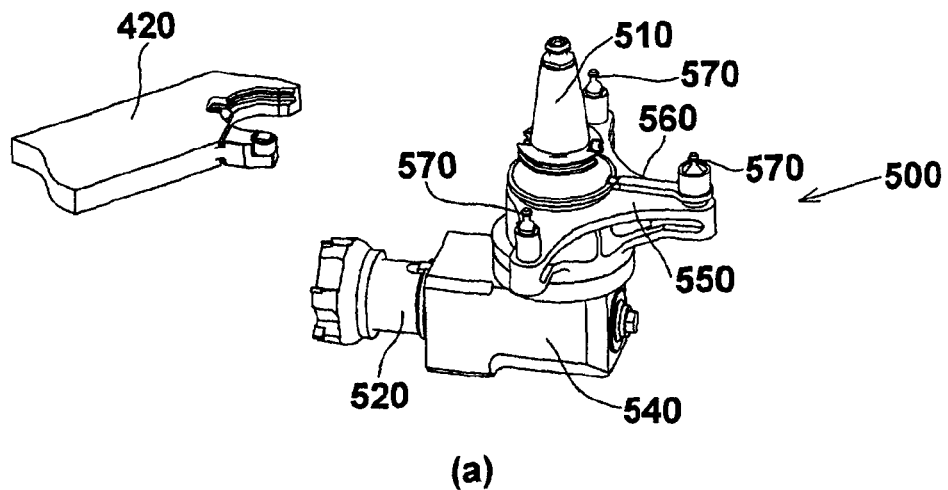
FIG. 1 is an explanatory view showing an example of a high rigidity angle tool holder according to the present invention.
Figure 1:
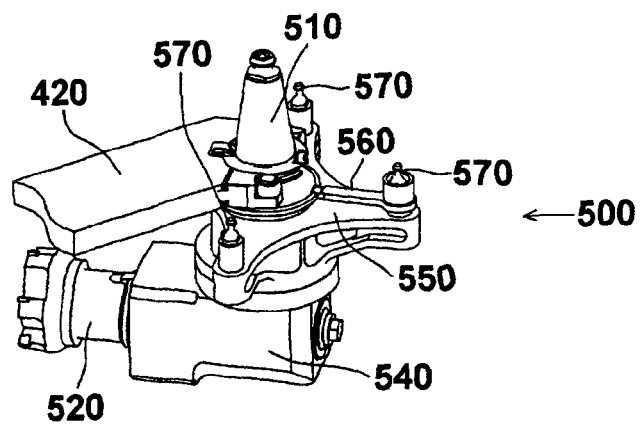
Figure 1:
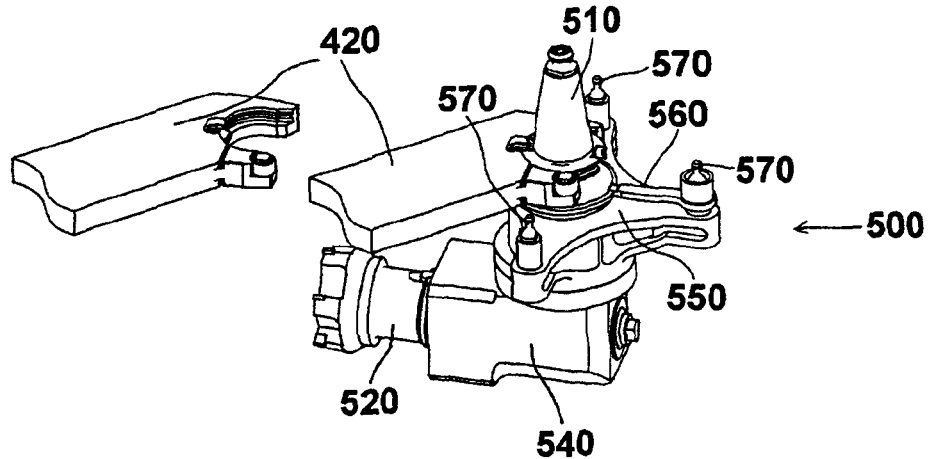

FIG. 1 is an explanatory view showing an example of a high rigidity angle tool holder according to the present invention applied to the above-mentioned attachment unit for five-face machining.

The angle tool holder denoted as a whole by reference number 500 has a shank 510 inserted to the spindle, wherein the drive shaft of the rotation of the shank 510 is varied in the orthogonal direction via a gear transmission mechanism or the like disposed within a housing 540, by which an angle cutter 520 is driven.

An arm 550 connected to the housing 540 is equipped with three pull stud bolts 570. The three pull stud bolts 570 are arranged at 90-degree angular intervals, and the three pull stud bolts are simultaneously clamped by three of the four collet chucks disposed on the attachment unit for five-face machining. A lever 560 used for allocating the angle tool holder 500 is disposed on the arm 550 where the pull stud bolt 570 is arranged at the center. The structure and the function of the lever 560 are the same as those described earlier.

This angle tool holder 500 can be automatically exchanged from the magazine to the spindle via the ATC arm 420, similar to the angle tool holder 200 mentioned earlier.

Figure 2:
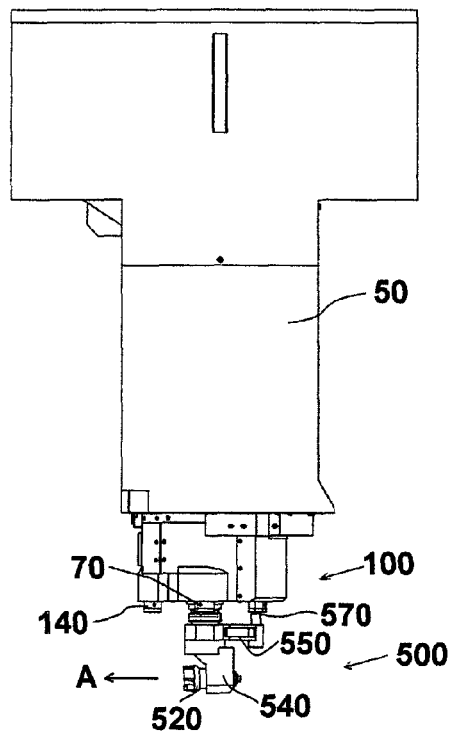
FIG. 2 is an explanatory view showing an example of use of the high rigidity angle tool holder according to the present invention.
Figure 2:
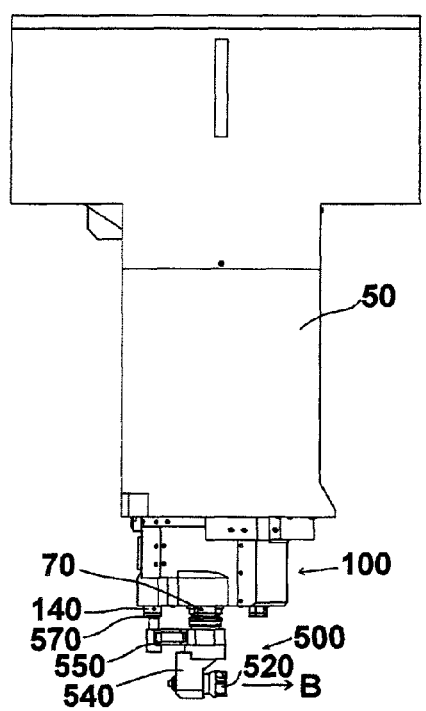

FIG. 2 is an explanatory view showing a state in which the angle tool holder 500 is attached to the attachment unit 100 for five-face machining disposed on the spindle head 50.

The attachment unit 100 for five-face machining includes four collet chucks 140 disposed on the circumference. Since the angle tool holder 500 according to the present invention has three pull stud bolts 570 disposed on the arm 550, it can be clamped at various angular positions varied by 90 degrees.

FIG. 2(a) shows a state in which the angle tool holder 500 is attached to the spindle 70 and the axis line of the angle cutter corresponds to the direction of arrow A. FIG. 2(b) shows a state in which the axis line of the angle cutter 520 corresponds to the direction of arrow B which is at an angle of 180 degrees from the direction of arrow A.

Figure 3:
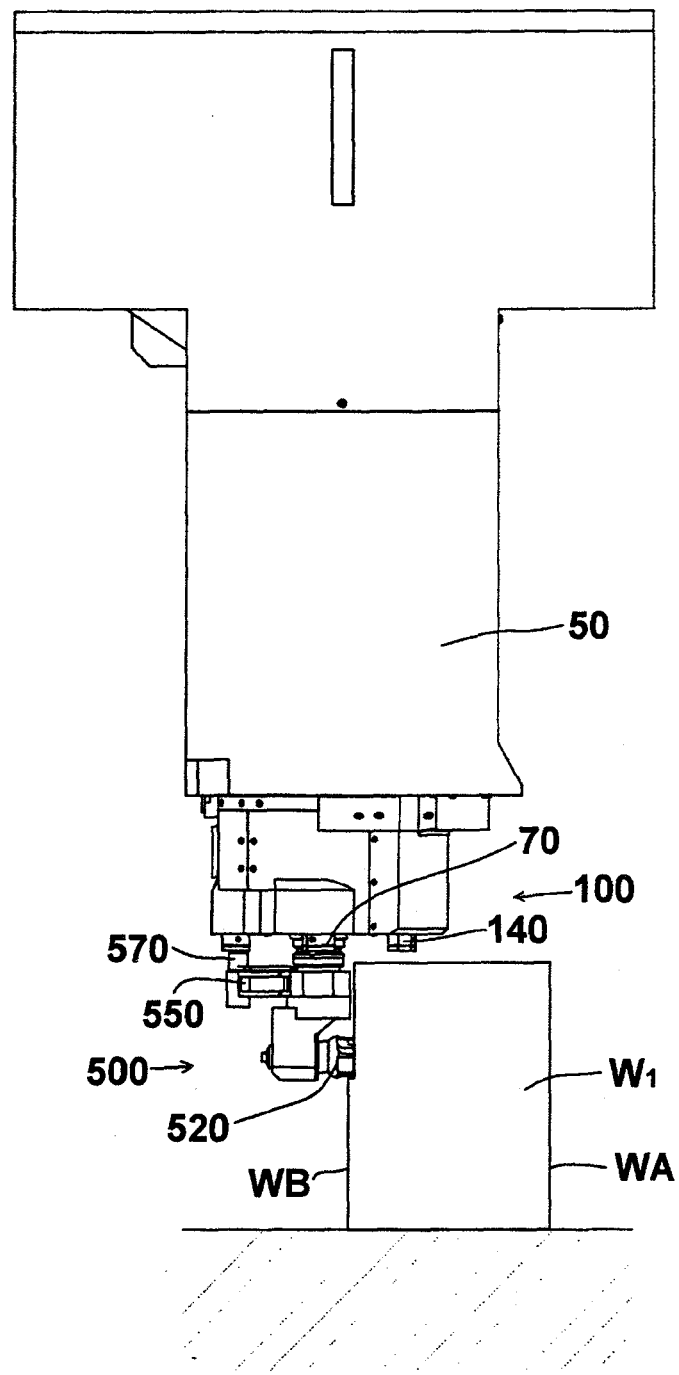
FIG. 3 is an explanatory view showing an example of use of the high rigidity angle tool holder according to the present invention.

FIG. 3 shows a state in which the angle tool holder 500 is used to machine a side wall of a workpiece $W_1$.

The angle tool holder 500 is attached in the direction shown in FIG. 2() so as to process a side wall WB of the workpiece $W_1$.

Since the angle tool holder 500 is supported on the attachment unit 100 for five-face machining via the three pull stud bolts 570 clamped by the three collet chucks 140, the angle tool holder has high rigidity and can perform heavy machining on the side wall WB of the workpiece $W_1$.

Figure 4:
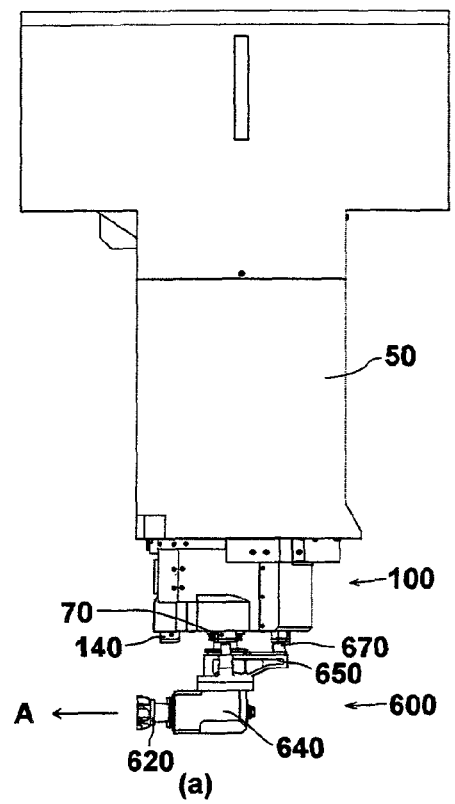
FIG. 4 is an explanatory view showing another example of the high rigidity angle tool holder according to the present invention.
Figure 4:
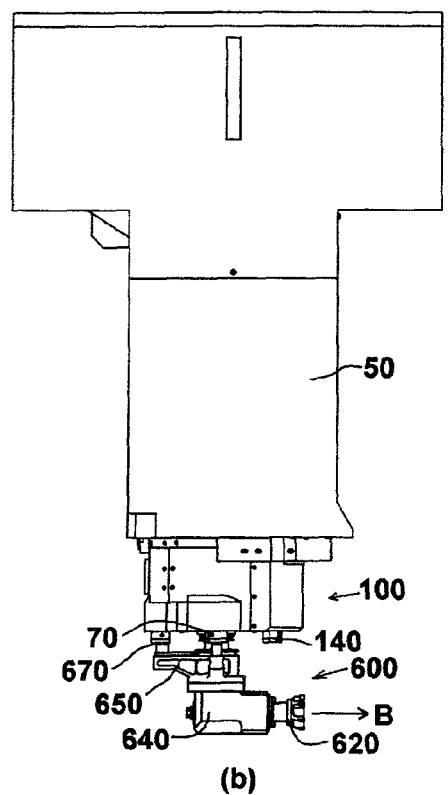

FIG. 4 is an explanatory view showing another example of the high rigidity angle tool holder according to the present invention.

An angle tool holder 600 has three pull studbolts 670 disposed on an arm 650, which are clamped via three of the four collet chucks 140 disposed on the attachment unit 100 for five-face machining.

The angle tool holder 600 is equipped with an angle tool 620 having a long projection so that the cutting edge position of the angle tool 620 is protruded from the center axis line of the spindle 70.

Figure 5:
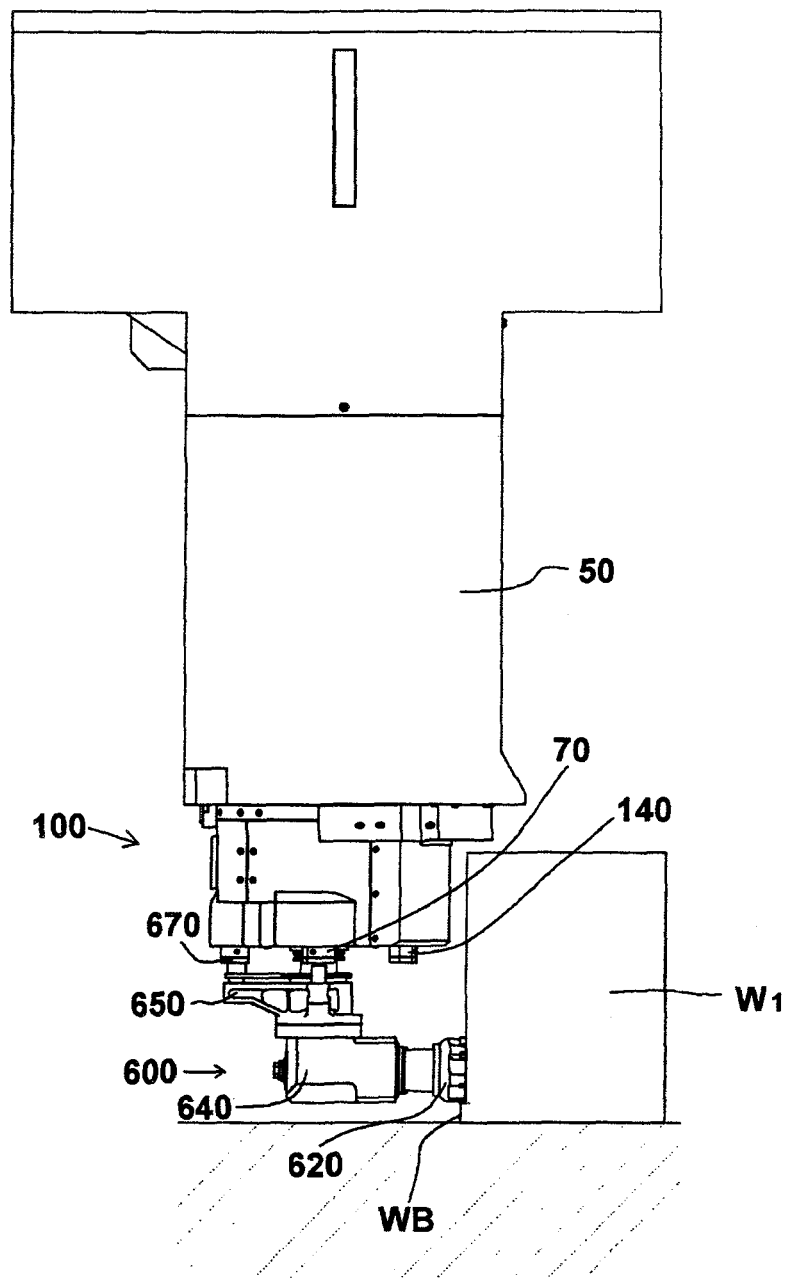
FIG. 5 is an explanatory view showing an example of use of the high rigidity angle tool holder according to of the present invention.

FIG. 5 shows a state in which the angle tool holder 600 is used to machine the side wall WB of a workpiece $W_1$. Since a large amount of the angle tool 620 is projected, deep areas of the workpiece $W_1$ can be machined thereby.

The present angle tool holder has the following advantages, since the angle tool holder is held via three of the four collet chucks disposed on the attachment unit for five-face machining.

(1) Interference between the workpiece and the machine is prevented during side wall machining since one of the collet chucks is not used for clamping the angle tool holder, and therefore, the angle tool holder can perform deep machining.

(2) The high rigidity angle tool holder according to the present invention can be clamped via a force three times greater than that of a single-point-clamped angle tool holder used in general, so that the angle tool holder can perform heavy machining.

(3) Since the angle tool holder is clamped via three points, it can be gripped by a standard ATC arm.

REFERENCES 50 spindle head
60 spindle housing
70 spindle
100 attachment unit for five-face machining
110 ring-shaped cylinder member
114 hydraulic chamber
116a, 116b ports
120 ring-shaped piston
130 clamp unit
140 collet chuck
142 piston
144 claw
150 body
152 hydraulic chamber
154a, 154b ports
200 angle tool holder
210 shank
212 shaft
220 angle cutter
240 housing
250 arm
260 lever
270 pull stud bolt
500 high rigidity angle tool holder
520 angle tool
550 arm
570 three pull stud bolts
600 high rigidity angle tool holder
620 angle tool
650 arm
670 three pull stud bolts

The invention claimed is:

1. An angle tool holder attached in an exchangeable manner to an attachment unit for five-face machining having a ring-shaped cylinder member fit to an outer circumference of a spindle housing supporting a spindle and protruded from a lower end of a spindle head of a vertical machining center and thereby secured to the spindle head, a clamp unit directly connected to a ring-shaped piston disposed within the ring-shaped cylinder member and moved vertically, and four collet chucks disposed at even angular intervals on a circumference on a lower side of the clamp unit, wherein the angle tool holder comprises a shank inserted to the spindle of the vertical machining center, a housing supporting the shank and an angle tool in a rotatable manner and having in the interior thereof a transmission mechanism for converting a drive force of the shank to an orthogonal direction and transmitting the same to the angle tool, an arm connected to the housing, and three pull stud bolts disposed on the arm and held via three collet chucks out of the four collet chucks disposed on the attachment unit for five-face machining.

2. The angle tool holder according to claim 1, further comprising a single lever disposed on a pull stud bolt arranged at a center of the three pull stud bolts disposed on the arm for transmitting the rotation of the spindle in a disengageable manner to the arm.

\* \* \* \* \*